(12) United States Patent
Peterson et al.

(10) Patent No.: US 11,788,828 B1
(45) Date of Patent: Oct. 17, 2023

(54) DIRECT SENSING SYSTEM FOR A SPHERICAL JOINT

(71) Applicant: Caterpillar Inc., Peoria, IL (US)

(72) Inventors: Jeremy T. Peterson, Washington, IL (US); Daniel P. Sergison, East Peoria, IL (US); Edward William Mate, Manhattan, IL (US); Jeffrey L. Kuehn, Germantown Hills, IL (US); Andrew J. de Haseth, Marana, AZ (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/856,656

(22) Filed: Jul. 1, 2022

(51) Int. Cl.
*G01B 7/315* (2006.01)

(52) U.S. Cl.
CPC .................. *G01B 7/315* (2013.01)

(58) Field of Classification Search
CPC ...................................... G01B 7/315
USPC ............................ 33/1 PT, 203.18
See application file for complete search history.

(56) References Cited

U.S. PATENT DOCUMENTS

| | | | |
|---|---|---|---|
| 6,412,182 B1 * | 7/2002 | Reichl | G01D 5/145 33/708 |
| 6,879,240 B2 | 4/2005 | Kruse | |
| 6,885,188 B2 * | 4/2005 | Russell | E21B 47/022 33/352 |
| 6,922,899 B2 * | 8/2005 | Nakamura | G01D 18/001 33/1 PT |
| 7,392,588 B2 * | 7/2008 | Brandl | G01D 5/20 33/1 PT |
| 7,405,557 B2 | 7/2008 | Spratte et al. | |
| 7,467,473 B2 * | 12/2008 | Harrill | B60G 9/003 33/203.18 |
| 9,038,279 B2 * | 5/2015 | Chen | G01D 5/04 33/534 |
| 10,119,894 B2 * | 11/2018 | Holmes | F16C 11/0647 |
| 10,266,200 B2 | 4/2019 | Takenaka et al. | |
| 2003/0230449 A1 | 12/2003 | Nelson et al. | |
| 2021/0339799 A1 * | 11/2021 | Tonini | B62D 15/023 |
| 2022/0266905 A1 | 8/2022 | Krone et al. | |

* cited by examiner

*Primary Examiner* — George B Bennett (57) ABSTRACT

A device for measuring rotation of a spherical joint in a steering system, may include an anchor secured within a ball stud of the spherical joint and a rotational tie having a first end and a second end. The first end of the rotational tie may be secured to the anchor to hold the first end parallel to a longitudinal axis of the ball stud. The device may also include a rotation sensor including a sensor target rotationally coupled to the second end of the rotational tie and secured for free rotation to a framework of the spherical joint. The rotation sensor may also include an angle sensor configured and arranged to sense a changing angle of the sensor target.

20 Claims, 7 Drawing Sheets

DIRECT SENSING SYSTEM FOR A SPHERICAL JOINT

TECHNOLOGICAL FIELD

The present application relates generally to sensing (e.g., monitoring or measuring) rotation of components. More particularly, the present application relates to sensing relative rotation of two portions of a spherical joint. Still more particularly, the present application relates to measuring relative rotation about an axis and isolating such measurement from the effects of rotation about two orthogonal or other axes.

BACKGROUND

Vehicles or work machines such as heavy equipment machines including wheel loaders, haul trucks, road graders and/or other non-tracked equipment or vehicles may include steering systems allowing the path of the vehicle or work machine to be controlled by controlling the direction of the wheels. Depending on the nature of the steering system, various sensors may be used to determine the amount or direction of steering. One common steering system is an Ackerman steering system. An Ackerman steering system includes a linkage system that controls steering in a manner that accounts for the wheels being arranged at different radii. In some cases, hydraulic cylinders may be part of the linkage and used to operate the linkage.

One approach to sensing the amount and/or direction of steering involves sensors for detecting the stroke of the hydraulic cylinders within the steering system (see e.g., U.S. Pat. No. 10,266,200). By sensing/measuring the position of the cylinder rod relative to the cylinder, and with an understanding of the linkage geometry, the amount/direction of steering may be determined. However, sensor maintenance and replacement can be labor intensive and involve large amounts of down time due to the sensor being part of the cylinder system. U.S. patent application Ser. No. 17/180,321 discusses a system for detecting failure of an articulated steering system and relates to systems for measuring steering angles of a machine. In this system sensors may be located external to the cylinder rod to reduce repair time and cost. In some circumstances, this may expose the sensors to build up of debris and, in some cases, freeze thaw cycles of the debris.

SUMMARY

In one or more examples, a device for measuring rotation of a spherical joint in a steering system may include an anchor secured within a ball stud of the spherical joint and a rotational tie having a first end and a second end. The first end of the rotational tie may be secured to the anchor to hold the first end parallel to a longitudinal axis of the ball stud. The device may also include a rotation sensor including a sensor target rotationally coupled to the second end of the rotational tie and secured for free rotation to a framework of the spherical joint. The rotation sensor may also include an angle sensor configured and arranged to sense a changing angle of the sensor target.

In one or more other examples a work machine may include a frame, an engine arranged on the frame and configured for powering the work machine, a wheel system secured to the fame, and a steering system for turning a pair of wheels of the wheel system. The steering system may include a linkage system for controlling the relative amount of turning of the pair of wheels and including a hydraulic cylinder pivotally secured to a steering arm with a spherical ball joint. The ball joint may include a head of a ball stud arranged in a cylinder eye with a bearing. The work machine may also include a direct sensing system for measuring the relative rotation of the ball stud about the longitudinal axis of the ball stud. The direct sensing system may include an anchor secured within the ball stud of the spherical joint and a rotational tie having a first end and a second end. The first end of the rotational tie may be secured to the anchor to hold the first end parallel to a longitudinal axis of the ball stud. The direct sensing system may also include a rotation sensor including a sensor target rotationally coupled to the second end of the rotational tie and secured for free rotation relative to the cylinder eye of the spherical joint. The rotation sensor may also include an angle sensor configured and arranged to sense a changing angle of the sensor target.

In one or more other examples, a device for measuring rotation of a spherical joint about a selected axis may include a rotational tie having a first end and a second end. The first end of the rotational tie may be configured for securing to a spherical portion of the spherical joint at an anchor point and parallel to the selected axis. The device may also include a rotation sensor including a sensor target rotationally coupled to the second end of the rotational tie and configured for securing for free rotation to a framework of the spherical joint. The rotation sensor may also include an angle sensor configured for arrangement on the framework of the spherical joint and configured to sense a changing angle of the sensor target.

DETAILED DESCRIPTION

Figure 1:
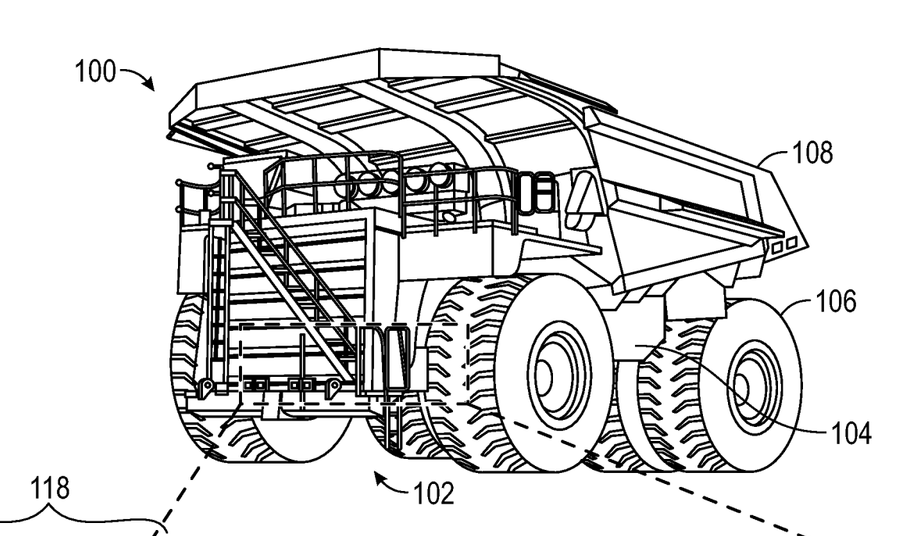
FIG. 1 is a front perspective view of a haul truck and an associated steering system, according to one or more examples.

FIG. 1 is a perspective view of a work machine 100 in the form of a haul truck having a steering assembly 102. Although the work machine 100 is depicted as a type of haul truck, the machine 100 may include any suitable machine, such as any type of loader, dozer, dump truck, compaction machine, backhoe, combine, scraper, trencher, tractor, combinations thereof, or the like. In particular, the work machine may be a wheeled machine as opposed to a tracked machine. The machine 100 may include a frame 104 and wheels 106.

The wheels 106 may be mechanically coupled to a drive train (not shown) to propel the machine 100. The machine 100 may include an engine that is of any suitable type, size, power output, etc. In some instances, the engine may be an internal combustion engine (e.g., gasoline, diesel fueled, etc.), natural gas powered, solar powered, or battery powered. When the engine is powered, the engine may cause the wheels 106 to rotate, via the drive train, to enable the machine 100 to traverse an environment. As such, the engine may be mechanically coupled to a variety of drive train components, such as a drive shaft and/or axles, to rotate the wheels 106 and propel the machine 100. In some instances, the drive train may include any variety of other components including, but not limited to a transmission, a differential, connector(s), constant velocity (CV) joints, etc.

As shown, the machine 100 may be configured to carry material in a dump box 108 or other moveable element(s) configured to move, lift, carry, and/or dump materials. The dump box 108 may be actuated by one or more hydraulic systems, or any other suitable mechanical system of the machine 100. In some instances, the hydraulic system may be powered by the engine, such as by powering hydraulic pump(s) (not shown) of the hydraulic system. However, it should be noted that in other types of machines (e.g., machines other than a mining truck) the hydraulic system may be in a different configuration than the one shown in FIG. 1, may be used to operate element(s) other than a dump box 108, and/or may be omitted.

In some instances, the machine 100 may include a cabin or other such operator station. The operator station is configured to seat an operator (not shown) therein. The operator seated in the operator station interacts with various control interfaces and/or actuators (e.g., steering wheel, levers, buttons, joysticks, etc.) within the operator station to control movement of the machine 100 (e.g., speed and steering direction) and/or various components of the machine 100, such as raising and lowering the dump box 108. Additionally, or alternatively, in some instances, and as discussed herein, the machine 100 may be remotely controlled by a remote operator or autonomously. For example, the machine 100 may operate autonomously along a predetermined path or route within an environment. In such instances, the machine 100 may include the operator station, or the operator station may be omitted. Further, the machine 100 may be remote controlled even in instances where an operator is positioned within the operator station.

Figure 3:
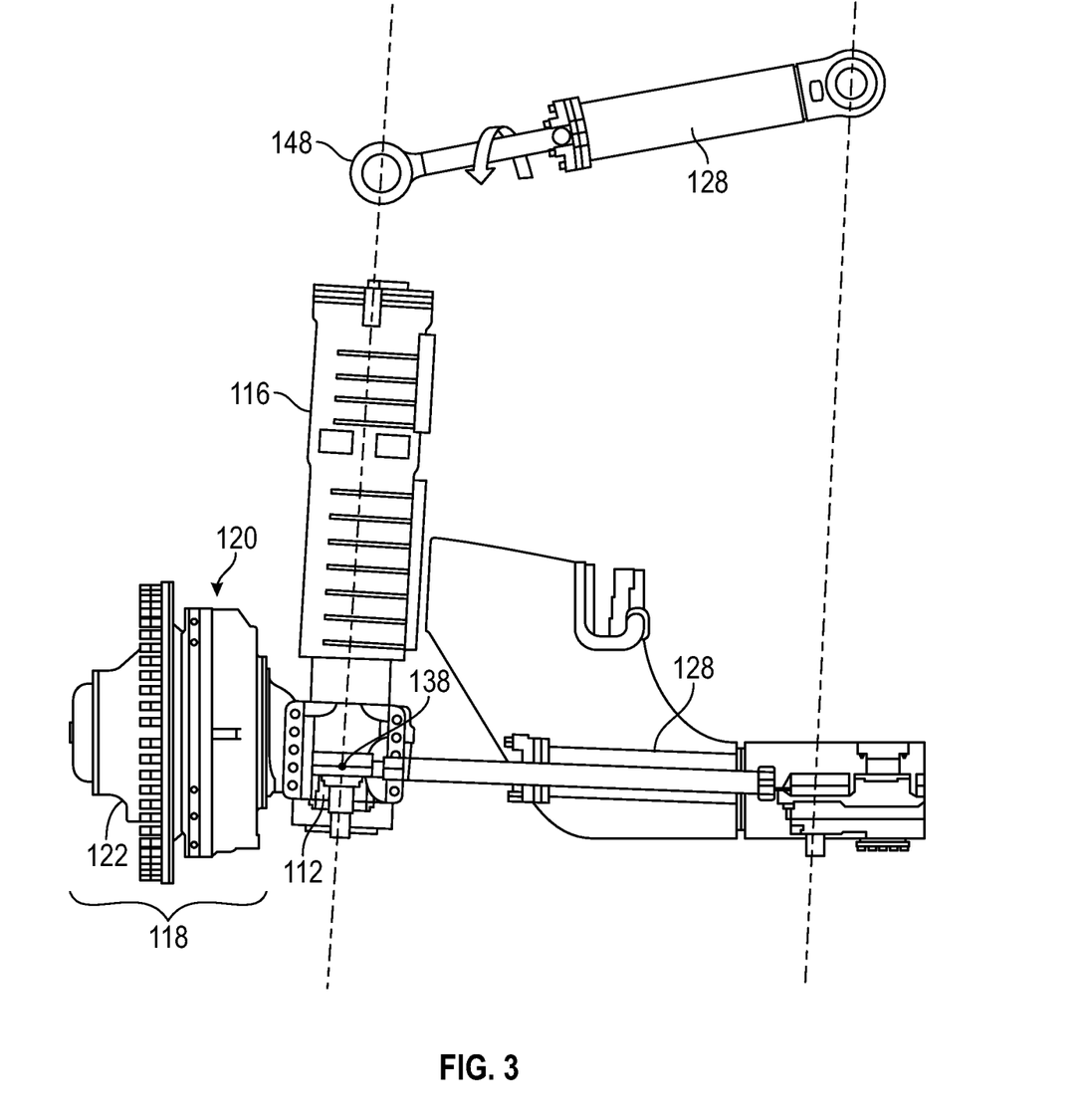
FIG. 3 is a schematic view depicting relative motion between an eye of a hydraulic cylinder and a ball stud of the spherical joint of FIG. 2.

The steering assembly 102 may be configured for controlling the rotational position of a front and/or a rear set of wheels to, in turn, control the direction of the machine. FIG. 1 includes detailed view of the steering assembly 102. As shown, the steering assembly 102 may include an Ackerman-type steering assembly. The steering assembly may include a central axle 110 connecting a set or pair of wheels 106. The axle 110 may have a first end portion and a second end portion. At or near each end portion, a laterally extending (e.g., lateral to the axle, but longitudinal to the machine) steering arm 112 may be provided. The steering arm 112 may be configured to pivot relative to the axle 110 and about a generally vertical axis 114. As shown in FIG. 3, the steering arm 112 may be arranged below a suspension system 116 that allows the wheel assembly 118 to move up and down relative to the frame 104 of the work machine 100 to absorb shocks from bumps in the supporting surface or other impacts. A wheel assembly 118 may be arranged on an outboard side of the steering arm 112 and may include a brake system 120, a hub 122 adapted for securing a wheel rim, and/or other wheel assembly features.

The steering system 102 may also include a linkage configured for controlling the pivoted position of each steering arm 112 of the steering system 102. The linkage may include a central hub 124, a pivoting stem 126, a pair of hydraulic cylinders 128, and a pair of control bars 130.

The central hub 124 may be configured as a central attachment point for one or more of the linkage elements mentioned. That is, for example, the central hub 124 may include a portion or, more simply, a location along the axle 110 that is adapted to secure one or more of the linkage elements. As shown in FIG. 1, the central hub 124 may include one or more brackets arranged at or near a central portion of the axle 110 for pivotally securing the pivoting stem 126 and each of the hydraulic cylinders 128.

The pivoting stem 126 may be configured to couple the control bars 130 to one another at a distance offset from the central hub 124. As shown, the pivoting stem 126 may be pivotally coupled to the central hub 124 and may extend in a forward direction relative to the work machine 100 to define an offset distance. The pivoting stem 126 may increase in width as it extends away from the central hub 124 and may form a T or Y shape where coupling points 132 are provided at the tips of the branching or widening shape. In one or more examples, the control bars 130 may be pivotally secured to the pivoting stem 126 at the coupling points 132.

The control bars 130 may be configured to tie the steering motion of the wheel assembly together from one side of the work machine 100 or vehicle to the other. For example, as shown, the control bars 130 may extend from an outboard end to an inboard end. The outboard end may be pivotally secured to a tip of the steering arm 112 and the inboard end may be pivotally secured to the pivoting stem 126. Accordingly, pivoting motion of one steering arm 112 may be tied to the opposing steering arm 112 via the control arms 130 and the pivoting stem 126. While not shown, for example, if the work machine 100 is steered to the right, the steering arm 112 on the right front may pivot in an outboard direction. The pivoting stem 126, likewise, may pivot in direction consistent with the right steering arm 112 and the left steering arm 112 may pivot in an inboard direction. The length of the pivoting stem 126, the spacing of the connection of the control bars 130 to the pivoting stem and other geometrical aspects of the linkage may be selected to control the relative amounts of rotation of the two steering arms 112 in an effort to avoid skidding or slipping of the wheels as corners are navigated.

The pair of hydraulic cylinders 128 may be configured to drive the steering system 102 and, thus, control the degree of turning performed by the machine 100. As shown, the hydraulic cylinders 128 may include an inboard end and an outboard end. The inboard end may be secured to the hub 124 at or near the location where the pivoting stem 126 is secured. The outboard end may be secured to the steering arm 112. The hydraulic cylinders 128 may be configured to act in unison, where, for example, when one cylinder 128 is extending its rod, the other cylinder 128 may be withdrawing its rod or avoiding resistance to withdrawing its rod. More particularly, for example, where work machine 100 is turning to the right, the hydraulic cylinder 128 on the right may extend its rod to pivot the steering in an outboard direction and the hydraulic cylinder 128 on the left may have a reduced pressure allowing its rod to be received into the cylinder 128. The control bar 130 secured to the right steering arm 112 may pull on the pivoting stem 126 and the left control bar 130 to cause the left steering arm 112 to pivot in an inboard direction. The opposite may be true when steering to the left.

Figure 2:
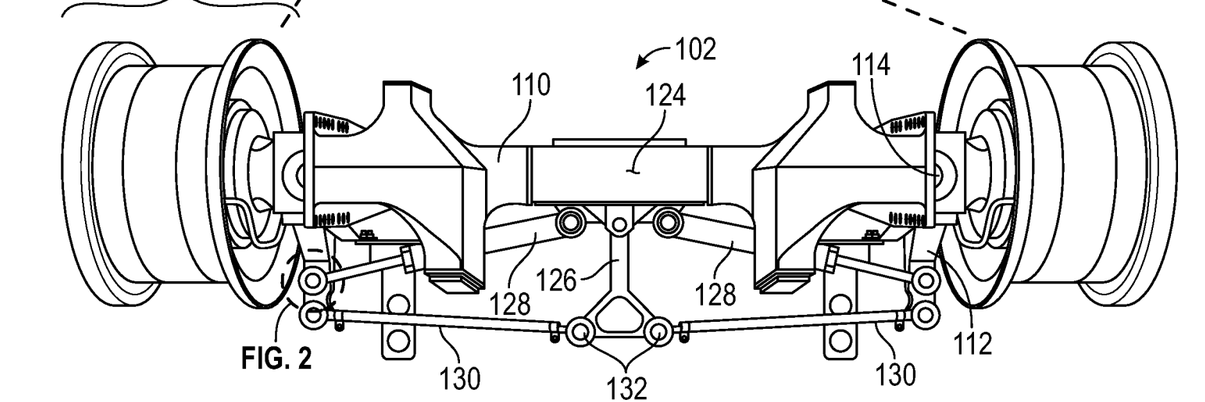
FIG. 2 is a cross-section view of a spherical joint of the steering system of FIG. 1, according to one or more examples.
Figure 4:
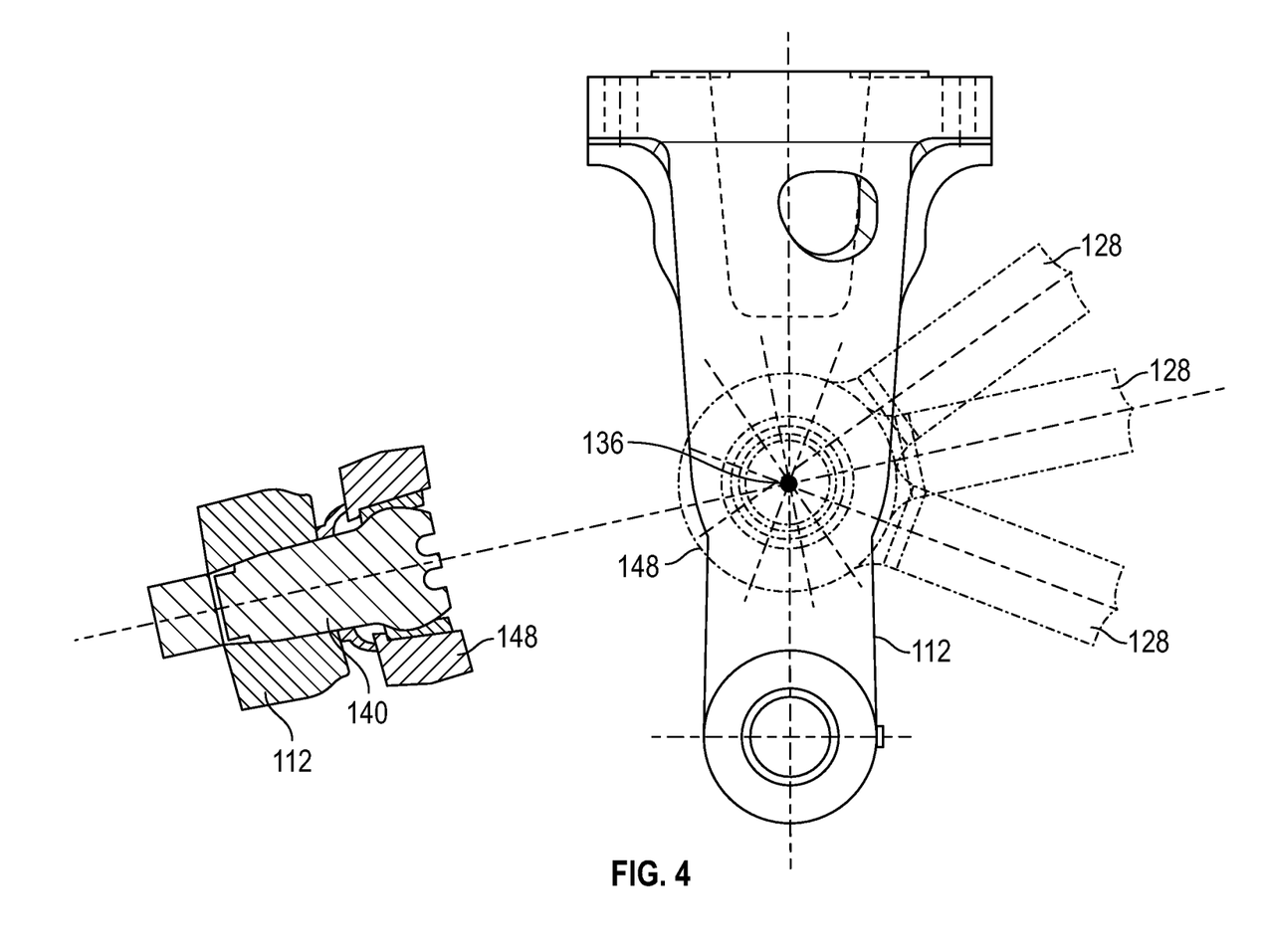
FIG. 4 is a schematic view depicting relative motion between an eye of a hydraulic cylinder and a ball stud of the spherical joint of FIG. 2.

As shown in FIG. 2, the hydraulic cylinders 128 may be secured to their respective steering arms 112 via a spherical joint 134. The spherical joint 134 may be configured to provide a pivoting connection between the hydraulic cylinder 128 and the steering arm 112 allowing for the relative rotation that is apparent from the above discussion. (e.g., relative pivoting motion about a generally vertical axis 136 as shown in FIG. 4). However, given the dynamics of vehicle motion and suspension systems, relative pivoting motion between the hydraulic cylinder 128 and the steering arm 112 may occur about other axes as well. For example, as shown in FIG. 3, as the wheel assembly 118 moves up and down during travel due to bumps, holes, or other unevenness in the ground, the wheel assembly 118 and the steering arm 112 may remain generally flat and/or parallel to the ground, but in a higher or lower position relative to the central hub 124 and other aspects of the steering system 102. As such, the angle between the hydraulic cylinder 128 and the steering arm 112 about a horizontal and longitudinally (relative to the vehicle) extending axis 138 may continually or periodically change. Still further, and with continued reference to FIG. 3, the rod portion of the hydraulic cylinder 128 may rotate within the cylinder portion causing rotation of the hydraulic cylinder 128 relative to the steering arm 112 about the axis of the rod.

In view of these dynamic motions, the hydraulic cylinders 128 may be secured to the steering arm 112 with the mentioned spherical joint 134. As shown in FIG. 2, the spherical joint 134 may include a ball stud 140, which has a partially spherical head 142 and a stem 144. The stem 144 may be adapted to extend downward along a longitudinal axis 146 from the spherical head 142 to engage the steering arm 112. As shown the stem 144 may be a tapered stem adapted to engage a tapered opening in steering arm 112. In one or more examples, the stem 144 may include a threaded tip that extends through the steering arm 112 which may receive a nut to secure the ball stud 140 to the steering arm 112. The tightening of the nut may draw the stem 144 of the ball stud 140 into the steering arm 112 generating friction between the mating tapered surfaces and resisting rotation of the ball stud 140 relative to the steering arm 112.

Figure 6:
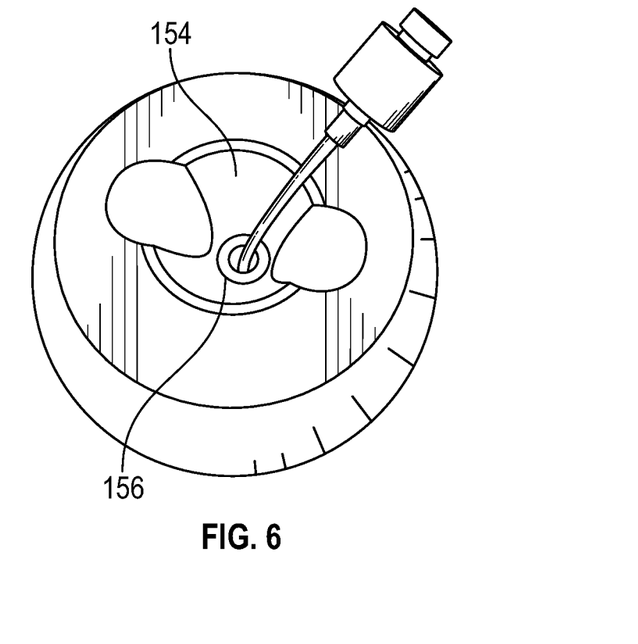
FIG. 6 is a perspective top view of a ball stud with a direct sensing system arranged thereon, according to one or more examples.
Figure 7:
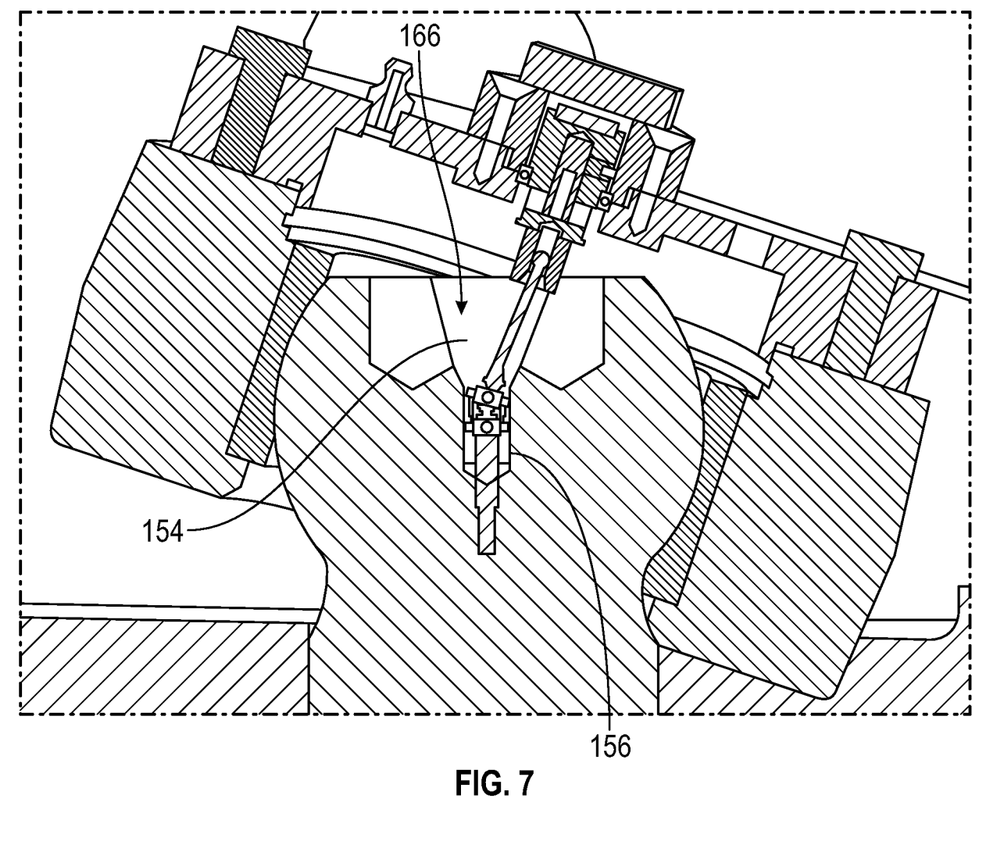
FIG. 7 is a cross-sectional view of a ball stud with a direct sensing system, according to one or more examples.

The partially spherical head 142 may be adapted to pivotally engage an eye 148 on the hydraulic cylinder 128. That is, as shown, the partially spherical head 142 may be arranged on a top portion of the stem 144 and may be exposed above the steering arm 112. The head 142 may be offset from the top of the stem 144 by a neck portion 150 and the head 142 may include a truncated or substantially flat bottom and a truncated substantially flat top separated by a spherical surface. The eye 148 of the hydraulic cylinder 128 may be arranged around the head 142 and secured to the head 142 with a bearing 152 forming a socket and allowing the eye 148 to pivot relative to the head 142 about 3 orthogonal axes so the joint between the hydraulic cylinder 128 and the ball stud 140 may accommodate all of the relative rotations discussed above. For purposes of accommodating the direct sensing system discussed below, and as shown in FIGS. 6 and 7, the head 142 of the ball stud 140 may include a recess 154 in a top surface thereof leading to a bore 156 that is aligned with the central longitudinal axis 146 of the ball stud 140. The recess 154 may be a conical or other shaped recess. The bore 156 may extend into the head 142 of the ball stud 140 a distance sufficient to allow placement of an anchor at the geometrical center of the sphere defined by the head 142 of the ball stud 140. More discussion of the anchor and its relation to the direct sensing system is included below.

Figure 5:
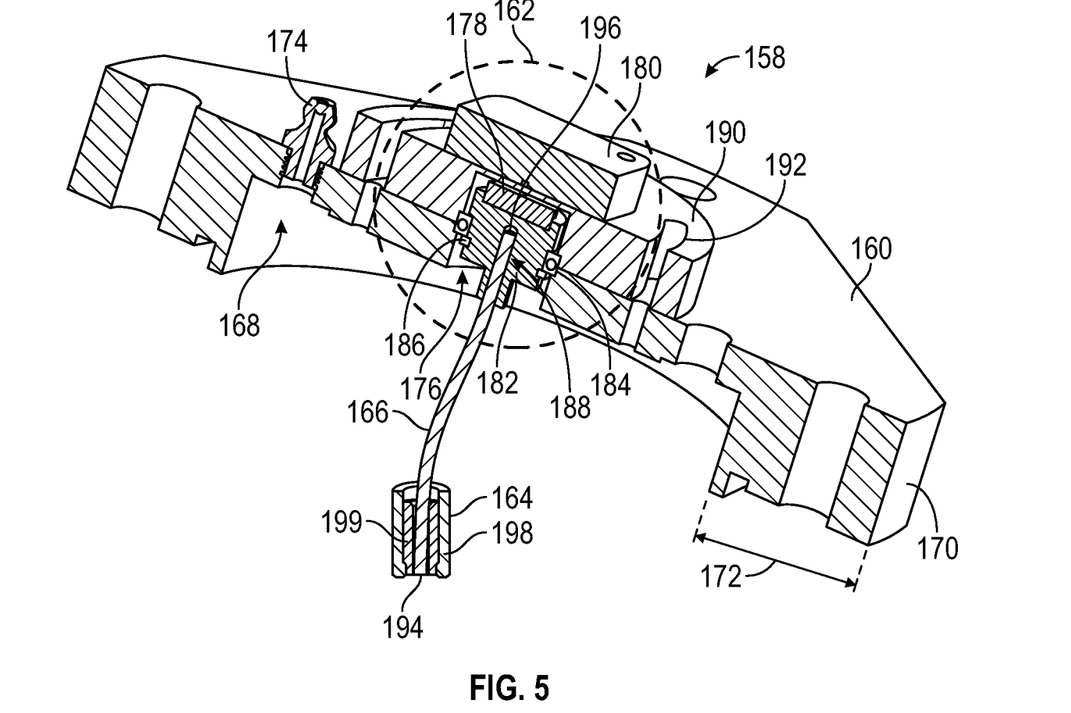
FIG. 5 is a perspective breakaway view of a direct sensing system for a spherical joint, according to one or more examples.

In one or more examples, a direct sensing system 158 may be provided that is configured for measuring the relative rotation of the ball stud 140 relative to the eye 148 of the hydraulic cylinder 128. In particular, this direct sensing system may be configured to isolate the relative rotation about the longitudinal axis 146 of the ball stud 140 from other relative rotations about other axes (e.g., the axis of the hydraulic cylinder and an axis 138 extending generally horizontally and along the vehicle or work machine 100). Still further, the direct sensing system 158 may be configured for installation or arrangement on the eye 148 of the hydraulic cylinder 128 with a portion engaged with the ball stud 140. As shown in FIG. 5, the direct sensing system 158 may include an eye cap 160, a sensor 162, an anchor 164, and a rotational tie 168.

The eye cap 160 may be configured to provide a support surface for portions of the sensor relative to the eye 148 of the hydraulic cylinder 128. As such, the eye cap 160 may be sized and shaped for arrangement on the eye 148 of the hydraulic cylinder 128 and to establish or define a cavity 168 above the ball stud 140 arranged in the eye 148. In one or more examples, the eye cap 160 may take the shape of an inverted shallow cup, where the outer peripheral surface 170 of the cup is sized to generally align with an outer surface of the eye 148 of the cylinder 128. The outer peripheral surface 170 of the cup may be a cylindrical surface or, as shown, an octagonal or other shape may be provided. The outer peripheral surface 170 may be sized to be larger than an inner diameter of the eye 148 such that the cap 160 covers the open area of the eye 148 and can contain lubrication within and around the top portion of the ball stem 140 and within the eye 148. The eye cap 160 may have a sidewall thickness 172 that reflects or resembles the thickness of the eye material. The sidewall may extend away from the eye 148 a relatively short distance defining an internal cavity 168 arranged above the head 142 of the ball stud 140. The eye cap 160 may include a top portion bridging across the sidewalls and defining a base portion of the internal cavity 168. In one or more examples, the sidewalls may have bolt holes for bolting the eye cap 160 to the eye 148 of the hydraulic cylinder 128. In addition, a grease fitting 174 may be arranged on the top portion and extending into the cavity 168 allowing grease or other lubrication to be injected into the cavity 168. The top portion of the eye cap 160 may also include a central opening 176 for receiving a portion of the sensor 162 and one or more bolt holes for securing another portion of the sensor 162.

With continued reference to FIG. 5, the sensor 162 may be arranged on the eye cap 160 and may be configured to sense relative rotation between the ball stud 140 and the eye 148 of the hydraulic cylinder 128 about the longitudinal axis 146 of the ball stud 140. In one or more examples, the sensor 162 may be a two-part sensor having a sensor target 178 and an angle sensor 180. In one or more examples a Hall effect sensor may be provided that can measure the amount of rotation of a rotating sensor target relative to a stationary angle sensor. That is, the rotating sensor target portion may include a magnet and the stationary angle sensor may measure changes in a magnet field due to rotation of the magnet. In one or more examples the rotating portion vs. stationary portion may be reversed and, for example, the magnet/target may be stationary and the angle sensor may rotate. Moreover, still other types of sensors may be used including, but not limited to, encoders or resolvers.

As shown in FIG. 5, the rotating sensor target 178 may be arranged on a carrier 182. The carrier 182 may be arranged in the central opening 176 of the eye cap 160 and may be configured to rotate relatively freely relative to the eye cap 160. As shown, for example, a bearing 184 may be arranged in the central opening 176 and may rest on an annular recess at the peripheral edge of the central opening on the outside surface of the eye cap 160. The carrier 182 may include a shoulder for engaging the bearing and may be arranged within the bearing where the shoulder prevents motion of the carrier 182 into the cavity 168 of the eye cap 160. A bearing retainer ring 186 may be arranged in a groove on the outside surface of the carrier to prevent upward movement or movement away from the cavity 168 by carrier 182. As such, the carrier 182 may be suspended in the central opening 176 and free to rotate relative to the eye cap 148. In one or more examples, the size of the carrier 182 and the position of the shoulder may be such that the top of the carrier 182 is raised up above the top surface of the eye cap 160. The carrier 182 may include a recess in a top surface thereof for receiving and holding the sensor target. As shown, the recess may be a circular recess adapted for holding a circular magnet, for example. Still other shapes of recess and magnet shapes may be provided. The carrier 182 may also be adapted for engagement with the rotational tie 166. That is, the carrier 182 may include a bore 188 extending upward into the carrier 182 from a bottom side thereof and opposite the sensor target recess. In one or more examples, the bottom of the carrier 182 may include a cylindrical protrusion aligned with the bore 188 and adapted to receive and hold the rotational tie 166 when the rotational tie 166 is inserted through the cylindrical protrusion and into the bore 188.

The sensor 162 may also include an offsetting or positioning plate 190 for supporting and orienting the stationary angle sensor 180 and may also be adapted to receive the carrier 182 and sensor target 178 into a bottom portion thereof so as to allow for close proximity arrangement of the sensor target 178 and the angle sensor 180. As shown, the offsetting or positioning plate 190 may be arranged over the central opening 176 and may be adapted to support the angle sensor 180. The plate 190 may have a recess in a bottom surface thereof that is sized to receive the top portion of the carrier 182 and the sensor target 178 with clearance on all sides to allow free movement of the carrier 182 and target 178 relative to the plate 190. The recess may pass substantially all the way through the thickness of the plate 190 leaving a relatively thin portion of the plate 190 to pass across the top of the carrier 182 and the sensor target 178. In an outer peripheral portion of the plate 190, a radiused and slotted hole 192 may be provided for each of the one or more bolt holes in the eye cap 160. The radiused and slotted holes 192 may have a radius center point at the center of the plate 190 and may allow for adjustably rotating the plate 190 about the center of the eye cap 160 to, for example, properly orient the angle sensor 180. The angle sensor 180 may be secured to an upper outside surface of the plate 190 at a center thereof and oriented to sense changes in a magnetic field due to the sensor target 178 arranged on the top of the carrier 182 and just below the top of the plate 190 in the recess of the plate 190.

The rotational tie 166 may be configured to physically communicate rotational motion of the balls stud 140 about its longitudinal axis 146 to the carrier 182 while isolating the carrier 182 from the effects of rotation of the ball stud 140 about other axes. In one or more examples, the rotational tie 166 may have an anchor end 194 and a carrier end 196 and may have a length extending from the anchor end 194 to the carrier end 196. At the anchor end 194, the rotational tie 166 may be secured to an anchor 164 or otherwise secured to the ball stud 140. At the carrier end 196, the rotational tie may be secured to the carrier 182 or otherwise secured to the sensor target 178. In one or more examples, the rotational tie 166 may include a flexible component that is generally free to bend about two orthogonal and laterally extending axes, but that is rigid with regard to twisting about its own longitudinal axis. For example, a substantially tightly wound spring or other component may be provided where the component may bend about an out of plane axis, but may resist twisting along its length and about its own longitudinal axis. In one or more examples, as shown in FIGS. 5 and 6, a flex shaft may be provided. Any rotational tie 166 may be used that translates rotation from one location to another location without change in the magnitude of the rotation. For example, any constant velocity system may be provided. In one or more examples, as shown in FIG. 7, a double cardan rotary linkage may be provided in lieu of the flex shaft. Still other approaches to providing a rotational tie 166 may be provided.

The anchor 164 may be configured to securely hold the anchor end 194 of the rotational tie 166 at, and in alignment with, the longitudinal axis 146 of the ball stud 140. That is, the anchor 164 may be arranged within a bore or opening 156 in the head 142 of the ball stud 140 such that the anchor 164 holds the anchor end 194 of the rotational tie 166 parallel to the longitudinal axis 146 of the ball stud 140. In one or more examples, the anchor 164 may be arranged on the longitudinal axis 146 and hold the anchor end 194 in alignment with the longitudinal axis 146. In still further examples, the anchor 164 may be arranged at a spherical center of the head 142 of the ball stud 140 and hold the anchor end 194 of the rotational tie 166 parallel to the longitudinal axis 146 of the ball stud 140. In still other embodiments, the anchor 164 may be offset from the longitudinal axis 146 of the ball stud 140, but may nonetheless hold the anchor end 194 of the rotational tie 166 parallel to the longitudinal axis 146 of the ball stud 140. It is to be appreciated that with suitable machining of the balls stud, the anchor 164 may be omitted and the rotational tie may be inserted into a bore that is parallel to the longitudinal axis of the ball stud.

The anchor 164 may include a ball stud guide 198 positioned in a bore 156 of the head 142 of the ball stud 140. The ball stud guide 198 may be adapted for a snug fit within the bore 156 or an adhesive, welding, or other securing technique may be used to secure the ball stud guide 198 within the head 142 of the ball stud 140. In one or more examples, the ball stud guide 198 may have a roughened or knurled outer surface to frictionally engage the bore 156 within the head 142 of the ball stud 140. In one or more examples, the bore 156 may extend to or passed the spherical center of the head 142 of the ball stud 140 and the ball stud guide 198 may be arranged at the spherical center of the head 142.

The anchor 164 may also include sliding portion 199. That is, as shown, a sliding portion 199 may be secured to the anchor end 194 of the rotational tie 166 by crimping, adhering, or otherwise attaching to the anchor end 194 of the rotational tie 166. The sliding portion 199 may be keyed to the ball stud guide 198 so as to be restricted from rotating relative to the ball stud guide 198, but may be able to slide relative to the ball stud guide 198. This feature may allow the longitudinal position of the anchor point of the anchor end 194 of the rotational tie 166 to be adjusted. This may be helpful to accommodate internal joint motion as the linkage ages, degrades, and wears. That is, for example, as the bearing 152 wears over time, the joint may develop play and the position of the head 152 relative to the sensor target and/or carrier may change as the head 142 moves in the bearing. The sliding portion may help to accommodate these changes in distance. Still further, the sliding motion of the sliding portion within the ball stud guide may help accommodate a wide variety of positions of the head 142 where, for example, the rotational tie would otherwise be stretched or strain would be induced in the rotational tie due to the distance between the two ends of the rotational tie changing. Still further the sliding motion of the sliding portion may compensate for changes in the effective length of the rotational tie due to bending.

It is to be appreciated that while a spherical joint within a steering system has been discussed, the direct sensing system 158 may be used on spherical joints of other systems. For example, where a hydraulic cylinder eye 148 is referenced above, other spherical joints may, instead have a framework surrounding the spherical ball and forming the socket for the spherical ball. Moreover, where a ball stud 140 is referenced herein with a head 142, a spherical ball or other spherical element may be provided in other spherical joints and arranged in the socket. Still further, where an eye cap 160 is referenced above, a grease cap or other cap may be provided in other spherical joints. Accordingly, the direct sensing system 158 may be used to measure rotation of the spherical ball or element within a spherical joint relative to the framework thereof where the anchor end of the rotational tie is secured to the spherical ball element and, at that location, is arranged parallel to the axis about which rotation is being measured. The carrier end of the rotational tie may be secured to a carrier secured for free rotation to the framework via a grease cap, for example. A sensor target may be arranged on the carrier and an angle sensor may be arranged on grease cap or otherwise supported off of the framework to sense the rotation of the sensor target.

It is to be further appreciated that while a spherical joint has been described, the direct sensing system may also be used with a pin joint, for example. The system may be helpful where misalignment between a sensor and a pin occurs or where, for example, wear of the pin joint occurs. The rotational tie may allow for suitable and accurate measurements even with one or more of these conditions.

INDUSTRIAL APPLICABILITY

It is to be appreciated that by placing the sensing system on the spherical joint between the ball stud and the cylinder eye, access to the sensor may be provided without disassembling the hydraulic cylinders or other major components of the work machine. Rather, access to and replacement of the sensor system may be available by way of removal of the grease or eye cap on the spherical joint or even without removing the grease or eye cap. Moreover, the position of the carrier and the sensor target within the grease or eye cap may protect the sensor from debris buildup and potential freeze/thaw damage resulting therefrom.

In operation and use, a method of measuring a rotational angle of a spherical joint may be provided. The method may include directly sensing the rotational angle while isolating the measurement from the effects of rotation about other axes of the spherical joint. That is, apart from the particular implementation on a spherical joint of a steering system described herein, the system and method may be used on any spherical joint and the measurement may occur during operation of the equipment. The method may be performed using a direct sensing system. The direct sensing system may include the system described herein. That is, the direct sensing system may include a sensor target arranged for free rotation relative to a framework of a spherical joint. In some cases, the sensor target may be arranged on a carrier configured to hold the sensor target. The system may also include an angle sensor that may be arranged on a plate or other structure for supporting an angle sensor on the framework above the sensor target. The sensor target may be rotationally secured to an anchor that is secured to the spherical ball of the spherical joint. In particular, a rotational tie may be used to secure the rotatable carrier and, thus, the sensor target, to the anchor. Moreover, the anchor end of the rotational tie may be held parallel to the longitudinal axis about which relative rotation is being measured. In the present case, the rotation desired was rotation about the longitudinal axis of the ball stud, but rotation about other axes may be measured by orienting the anchor end of the rotational tie parallel to a desired rotational axis.

Figure 8:
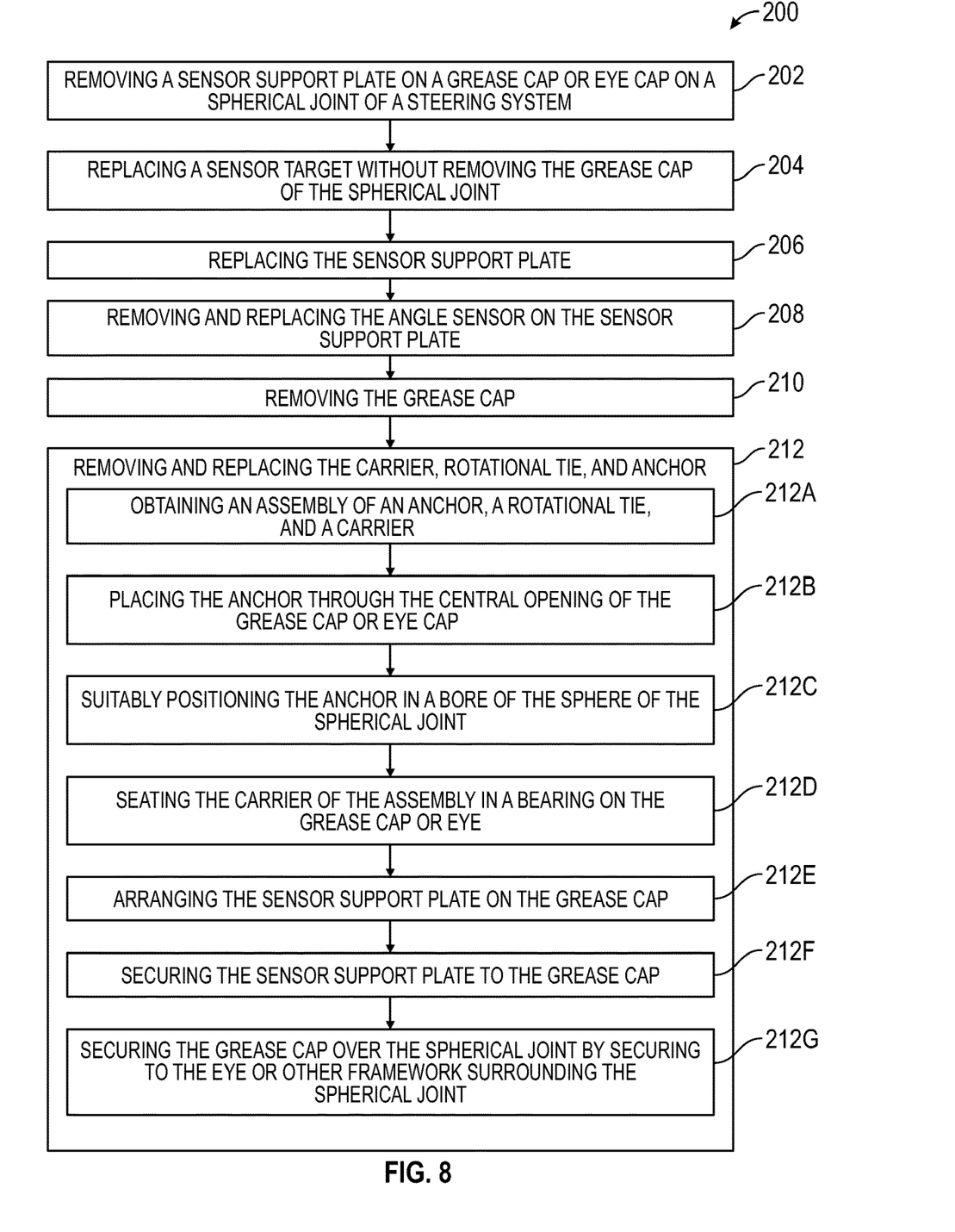
FIG. 8 is a diagram depicting a method of performing maintenance on a direct sensing system for a spherical joint.

A method 200 of repairing a steering angle sensor may also be provided. The method may include removing a sensor support plate on a grease cap or eye cap on a spherical joint of a steering system 202. In one or more examples, the spherical joint may be part of an Ackerman steering system. The method may also include replacing a sensor target without removing the grease cap of the spherical joint 204. The method may also include replacing the sensor support plate 206. The method may also include removing and replacing the angle sensor on the sensor support plate 208. In some situations where, for example, a full replacement of the direct sensing system components is desired, the grease cap may be removed 210 and the carrier, rotational tie, and anchor may be removed and replaced 212. In replacing, an assembly of an anchor, rotational tie, and carrier may be obtained or procured 212A. The anchor may be placed through the central opening of the grease cap or eye cap 212B and may be suitably positioned in a bore of the sphere of the spherical joint 212C. The carrier of the assembly may be seated in a bearing on the grease cap or eye 212D and the sensor support plate may be arranged on the grease cap 212E and secured thereto 212F. The grease cap may also be secured over the spherical joint and secured to the eye or other framework surrounding the spherical joint 212G. Still other iterations and version of the method of repair The above detailed description is intended to be illustrative, and not restrictive. The scope of the disclosure should, therefore, be determined with references to the appended claims, along with the full scope of equivalents to which such claims are entitled.

What is claimed is:

1. A device for measuring rotation of a spherical joint in a steering system, comprising:
   an anchor secured within a ball stud of the spherical joint;
   a rotational tie having a first end and a second end, the first end being secured to the anchor to hold the first end parallel to a longitudinal axis of the ball stud;
   a rotation sensor comprising:
   a sensor target rotationally coupled to the second end of the rotational tie and secured for free rotation to a framework of the spherical joint; and
   an angle sensor configured and arranged to sense a changing angle of the sensor target.

2. The device of claim 1, further comprising a carrier supporting the sensor target relative to the framework.

3. The device of claim 2, wherein the carrier is supported off of the framework by a bearing.

4. The device of claim 2, wherein the carrier supports the sensor target relative to a cap of the framework.

5. The device of claim 4, wherein the cap comprises a central opening and the carrier extends through the cap to support the sensor target above the surface of the cap.

6. The device of claim 5, further comprising a positioning plate arranged on the cap and having a recess for receiving the carrier into a bottom side thereof.

7. The device of claim 6, wherein the angle sensor is arranged on the positioning plate.

8. The device of claim 1, wherein the anchor is configured for a friction fit in a bore of the ball stud.

9. The device of claim 1, wherein the rotational tie is a flex shaft.

10. The device of claim 1, wherein the rotation sensor is a Hall effect sensor.

11. A work machine, comprising:
a frame,
an engine arranged on the frame and configured for powering the work machine;
a wheel system secured to the fame; and
a steering system for turning a pair wheels of the wheel system, the steering system comprising a linkage system for controlling the relative amount of turning of the pair of wheels and including a hydraulic cylinder pivotally secured to a steering arm with a spherical ball joint, the ball joint having a head of a ball stud arranged in a cylinder eye with a bearing; and
a direct sensing system for measuring the relative rotation of the ball stud about the longitudinal axis of the ball stud, the direct sensing system comprising:
an anchor secured within the ball stud of the spherical joint;
a rotational tie having a first end and a second end, the first end being secured to the anchor to hold the first end parallel to a longitudinal axis of the ball stud;
a rotation sensor comprising:
a sensor target rotationally coupled to the second end of the rotational tie and secured for free rotation relative to the cylinder eye of the spherical joint; and
an angle sensor configured and arranged to sense a changing angle of the sensor target.

12. The work machine of claim 11, further comprising a carrier supporting the sensor target relative to the cylinder eye.

13. The work machine of claim 12, wherein the carrier is supported off of the cylinder eye by a bearing.

14. The work machine of claim 12, wherein the carrier supports the sensor target relative to a cap of the on the cylinder eye.

15. The work machine of claim 14, wherein the cap comprises a central opening and the carrier extends through the cap to support the sensor target above the surface of the cap.

16. A device for measuring rotation of a joint about a selected axis, comprising:
a rotational tie that is flexible about two lateral extending axes and rotationally rigid about a longitudinal axis, the rotational tie having a first end and a second end, the first end being configured for securing to a rotating portion of the joint at an anchor point and parallel to the selected axis;
a rotation sensor comprising:
a sensor target rotationally coupled to the second end of the rotational tie and configured for securing for free rotation to a framework of the joint; and
an angle sensor configured for arrangement on the framework of the joint and configured to sense a changing angle of the sensor target.

17. The device of claim 16, further comprising an anchor secured to the first end of the rotational tie and configured for a friction fit in a bore of the rotating portion of the joint.

18. The device of claim 17, further comprising a carrier configured for supporting the sensor target relative to the framework.

19. The device of claim 18, wherein the carrier is configured for supporting the sensor target relative to a cap of the framework.

20. The device of claim 19, wherein the cap comprises a central opening and the carrier is configured to extend through the cap to support the sensor target above the surface of the cap.

* * * * *